United States Patent
Borg et al.

(10) Patent No.: US 6,349,742 B1
(45) Date of Patent: Feb. 26, 2002

(54) DUAL-SEAT VALVE ABLE TO SWITCH IN A LEAK-FREE MANNER

(75) Inventors: Søren Borg, Horsens; Poul Holmgaard, Haderslev, both of (DK)

(73) Assignee: Alfa Laval LKM A/S, Kolding (DK)

( * ) Notice: Subject to any disclaimer, the term of this patent is extended or adjusted under 35 U.S.C. 154(b) by 0 days.

(21) Appl. No.: 09/423,988

(22) PCT Filed: May 18, 1998

(86) PCT No.: PCT/EP98/02910

§ 371 Date: Feb. 23, 2000

§ 102(e) Date: Feb. 23, 2000

(87) PCT Pub. No.: WO98/54494

PCT Pub. Date: Dec. 3, 1998

(30) Foreign Application Priority Data

May 30, 1997 (DE) .......................................... 197 22 615

(51) Int. Cl.⁷ ........................... F16K 11/20; F16K 51/00

(52) U.S. Cl. .................... 137/614.18; 137/312; 137/240

(58) Field of Search ............................. 137/614.11, 312, 137/614.18, 240

(56) References Cited

U.S. PATENT DOCUMENTS

| 4,460,014 A | * | 7/1984 | Mases et al. .......... 137/614.18 |
| 4,605,035 A | * | 8/1986 | Rasmussen et al. 137/614.18 X |
| 6,178,986 B1 | * | 1/2001 | Burmester ......... 137/614.18 X |

* cited by examiner

*Primary Examiner*—Kevin Lee
(74) *Attorney, Agent, or Firm*—Michael J. Striker

(57) ABSTRACT

The invention relates to a dual-seat valve that switches without leakage. On both the valve seat and the closing member, a respective cylindrical face is provided, and these faces together form a throttle gap. In the cleaning stroke of the closing member, pressure spikes in the leakage chamber are averted. In the cleaning of the seat, the flow of cleaning medium is also comparatively insensitive to fluctuations in the cleaning stroke.

7 Claims, 5 Drawing Sheets

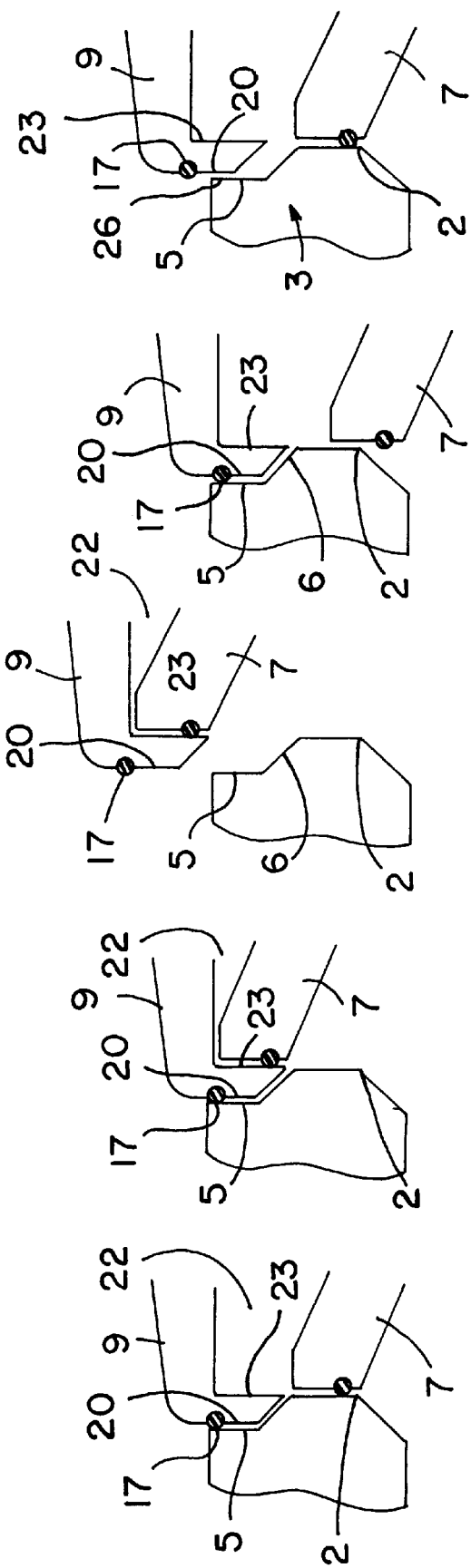

DUAL-SEAT VALVE ABLE TO SWITCH IN A LEAK-FREE MANNER

BACKGROUND OF THE INVENTION

The invention relates to a dual-seat valve that switches in a leak-free manner, including: a valve housing part having at least two openings for two lines for letting fluid in and out, two coaxial valve seats disposed between these openings, two valve closing members that are each guided in the valve housing between an open position and a closing position for the sake of coaxial motion relative to one another and to the corresponding valve seats and which in their closing position effect double sealing between the aforementioned openings, the first closing member being a slide piston with radial sealing means disposed on its end portion, which piston is intended to press, during its opening motion, against the second closing member and during the continued opening motion moving the latter into its open position as well, the first valve seat being cylindrical and in the closing position receiving the slide piston in sealing fashion, and both in the closing position and in the open position a leakage chamber is formed between the closing members, which communicates permanently with the outside of the valve via a drain outlet.

A dual-seat valve of this kind is known from European Patent Disclosure EP 0 174 384. Such valves are used in the foods industry, especially in brewing and milk processing, for separating lines that carry different products at their connection points. The valve must be capable of reliably preventing mixing of the different products and must be capable of functioning perfectly from a hygienic standpoint. The two closing members of the known valve can therefore each execute a cleaning stroke individually for cleaning of the valve seat. During the valve seat cleaning, however, only a single seal separates the two lines. Hence there is the risk that a pressure spike may force the closed closing member out of its valve seat, which would allow the products in the lines to mix together. Such pressure spikes occur above all when the closing members are individually lifted for cleaning, since when the one closing member is opened, the line pressure suddenly acts on the other closing member, reducing its contact pressure against the valve seat. In the known dual-seat valve, a groove is therefore provided on the second valve seat and on the end, toward the first closing member, of the recess of the second closing member. During the cleaning of the valve seat, a flow of cleaning medium can flow into the leakage chamber through the gap formed by the groove between the closing member and the valve seat or the recess.

From German Patent DE 38 35 944 C2, a dual-seat valve of this generic type is also known. To compensate for pressure surges, the second, lower closing member is lengthened toward the underside of the valve to form a compensation piston, which passes in sealed fashion through the lower part of the housing. In the cleaning stroke of the lower closing member, a circular gap is formed both between the lower valve plate and the valve seat and between the outer face of the compensation piston and the wall of the passage in the lower housing part; by way of this gap, cleaning fluid can enter the leakage chamber or the rinsing region for the compensation piston.

A disadvantage of the known dual-seat valve is that the cleaning stroke must be executed with great precision; otherwise, the cleaning gap between the valve seat and the closing member becomes too large, and large quantities of cleaning medium flow into the leakage chamber. This leads to an uncontrolled increase in the pressure in the leakage chamber and thus to stress on the closed closing member. There is accordingly the risk that the closing member will be lifted and cleaning fluid can enter the line carrying a product. Another disadvantage is that when the cleaning gap between the closing member and the valve seat is opened, the pressure in the leakage chamber is suddenly raised, as a result of which the other closing member can also be forced out of its seat.

SUMMARY OF THE INVENTION

The object of the invention is therefore to disclose a dual-seat valve of this generic type in which pressure spikes in the leakage chamber can be reliably avoided during the seat cleaning.

This object is attained in that a cylindrical inside face is provided at the second valve seat, and a cylindrical portion corresponding to it is provided on the second closing member, the diameter of which portion is slightly less than the diameter of the cylindrical inside face of the second valve seat, and the cylindrical faces, both in the cleaning stroke and in the closing and opening motion of the second closing member, form a throttle gap between them, and that a sealing means is provided on the second closing member in such a way that in the closing motion, the throttle gap is formed first, before the sealing means seals off the leakage chamber from the line.

In the cleaning stroke of the valve member, cleaning fluid enters only through the throttle gap formed between the two cylindrical faces. As a result, the pressure buildup in the leakage chamber takes place slowly and uniformly. Both pressure and a volumetric flow of the cleaning fluid flowing into the leakage chamber can easily be controlled. Because of the length of the throttle gap, the pressure and the volumetric flow are also relatively insensitive to fluctuations in the stroke of the closing member, so that precise adjustment and monitoring of the stroke is unnecessary. A pronounced pressure rise in the leakage chamber during the cleaning process is reliably prevented.

Pressure spikes in the cleaning stroke of the slide piston are avoided if in the cleaning position of the slide piston, a cylindrical throttle gap is formed between a cylindrical face of the slide piston and the first valve seat.

The sealing means can be formed as a radial seal on the slide piston and/or on the second closing member. However, it is also possible to embody the sealing means at the second closing member as an axial or conical seal. It is then positioned on the end of the second closing member toward the slide piston.

The guidance of the closing member on moving inward is facilitated if the second valve seat has a conical portion, which extends from the cylindrical portion of the second valve seat to the first valve seat. By means of the conical face, the slide piston is guided in the closing motion of the valve and centered in the valve seat. The radial sealing means of the slide piston are not stressed by the upper edge of the first valve seat and are therefore subjected to less wear.

Guidance and centering of the second closing member in the valve seat is attained if the second valve seat has a conical portion that adjoins the cylindrical portion toward the opening side of the second closing member.

Fast and easy replacement of the sealing means is possible if the closing member is constructed from two parts joined together separably, preferably by means of a screw connection, and the sealing means is provided between the two parts.

In an especially advantageous embodiment, the second closing member, on its end toward the slide piston, has a recess with a substantially cylindrical circumferential wall aligned with the cylindrical valve seat, and the recess is dimensioned so as during the opening motion to sealingly receive the end portion and the radial sealing means of the slide piston, before the second closing member opens. Since in the closing motion of the valve the recess of the second closing member and the cylindrical valve seat of the slide piston are centered by the conical faces of the second valve seat, the recess and the first valve seat are aligned with one another. In the closing motion of the slide piston, this piston is centered by the conical face of the second valve seat, so that virtually no wear from the closing motion is brought about at its radial seals.

BRIEF DESCRIPTION OF THE DRAWINGS

The invention will be described along with further advantageous details of the drawing figures, in terms of a preferred embodiment in conjunction with a drawing. Functionally identical elements are identified by the same reference numerals.

Individually, the drawings show:

FIGS. 8a–c: a detail of a section through a third embodiment of the dual-seat valve, showing successive steps in the opening of the valve;

FIG. 9: the cleaning stroke of the first closing member of a dual-seat valve of FIG. 8;

FIG. 10: the cleaning stroke of the second closing member of a dual-seat valve of FIG. 7.

DETAILED DESCRIPTION OF THE INVENTION

Figure 1:
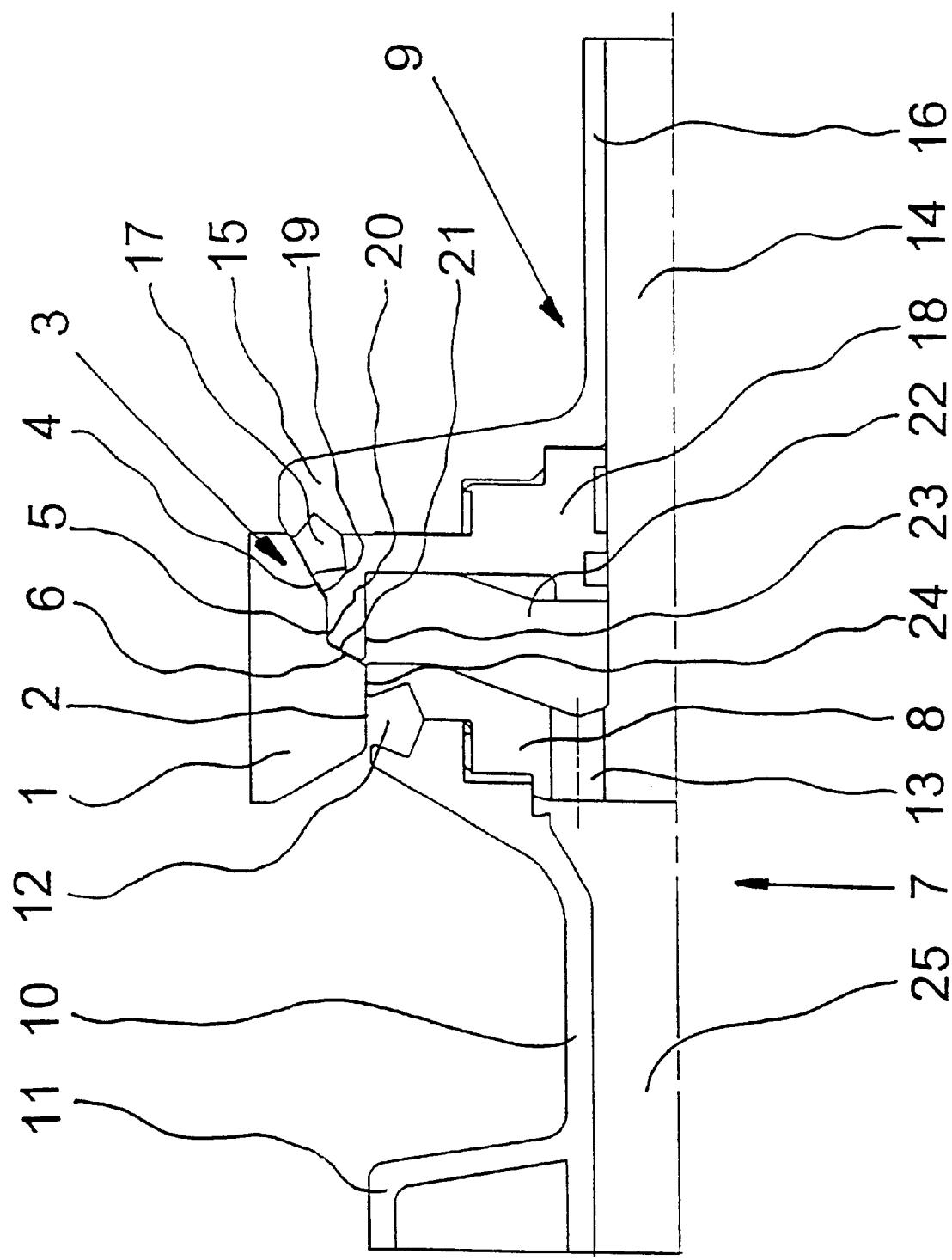
FIG. 1: a detail of a section through a first embodiment of the dual-seat valve.

FIG. 1a shows a housing part 1, in which a first, cylindrical valve seat 2 and a second valve seat 3 are formed. The second valve seat has a first conical portion 4 and a cylindrical portion 5. The cylindrical portion is adjoined, toward the first valve seat, by a second, also conical portion 6. That portion is then adjoined by the first, cylindrical valve seat 2.

In the first valve seat 2, a first closing member is received, embodied as a slide piston 7. The slide piston 7 is composed of a first part 8, which is oriented toward the second closing member 9, and a second part 10, which continues in the form of a compensation piston 11. The first and second parts each have a recess on their circumference, and the recesses together receive a seal 12 that rests on the first valve seat 2. The first and second parts are joined by a screw connection (not shown). Once the closing members have been removed, the first and second parts 8 and 10 can easily be separated from one another so that the seal 12 can be changed. The cylindrical portion 24 of the first part 8 of the slide piston 7 has a slightly smaller diameter than the first valve seat 2. A gap is therefore formed between the valve seat 2 and the portion 24, with a width typically of 0.15 mm.

The face of the first part 8 oriented toward the second closing member is inclined toward an opening 13, which carries the leakage away to an outflow line 25. The motion of the first closing member is effected via a first valve rod 14.

The second closing member is also constructed in two parts. It comprises a third part 15, which ends in a second valve rod 16 embodied as a hollow rod. The first valve rod 14 is displaceably supported in the second valve rod 16. Toward its edge, the third part 15 has a recess, which together with a recess on the fourth part 18 receives a seal 17.

Along its circumference, the fourth part 18, which is separably joined to the third part 15 by a screw connection, has a first conical portion 19, which adjoins the seal 17 and corresponds to the corresponding first conical portion 4 of the housing part 1. This portion 19 is adjoined by a cylindrical portion 20, which corresponds with the corresponding cylindrical portion 5 of the housing part. The diameter of the two cylindrical portions 5 and 20 is selected such that between them a gap with a width of typically 0.15 mm is formed. The cylindrical portion 20 is adjoined by a second conical portion 21, which corresponds to the corresponding second conical portion 21 in the housing part 1.

On its side toward the slide piston 7, the second closing member 9 has a recess 22, whose cylindrical inner wall 23 is aligned with the first valve seat. Its dimensions are such that the slide piston 7 can be received by one end in it.

Figure 2A:
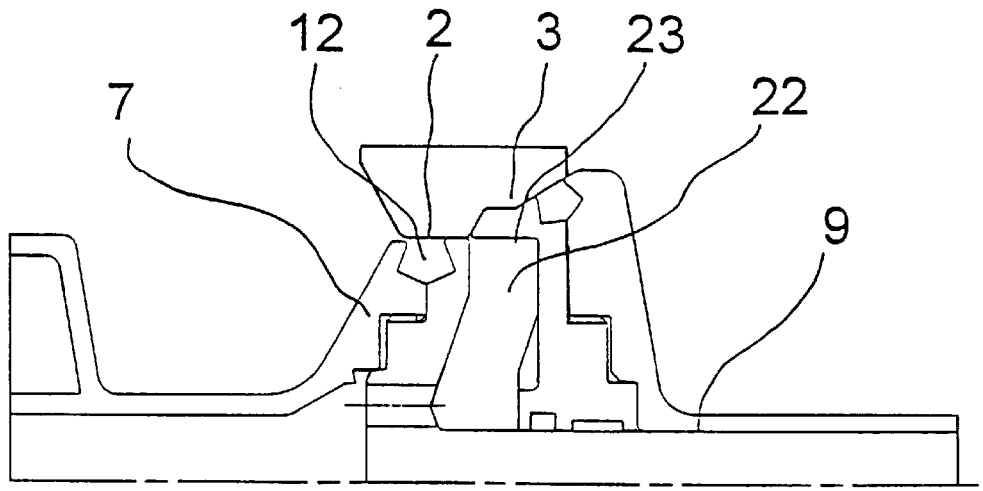
FIGS. 2a–c: a detail of a section through a first embodiment of the dual-seat valve, showing successive steps in the opening of the valve.
Figure 2B:
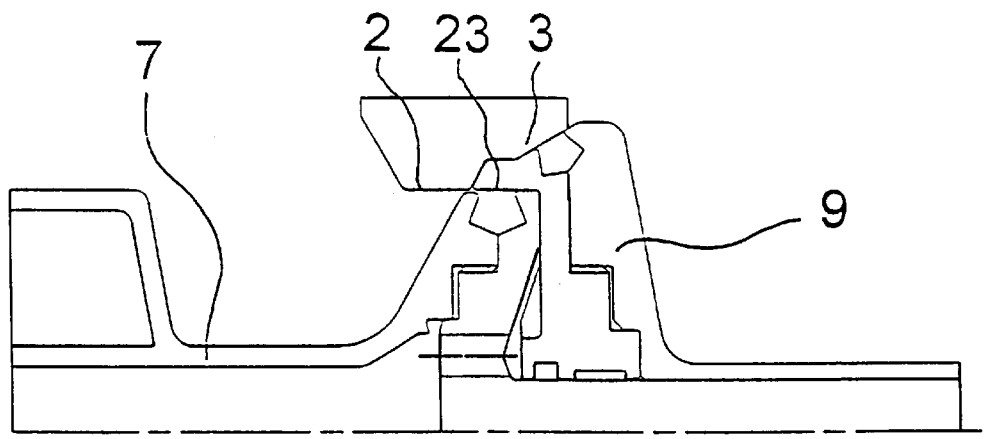
Figure 2C:
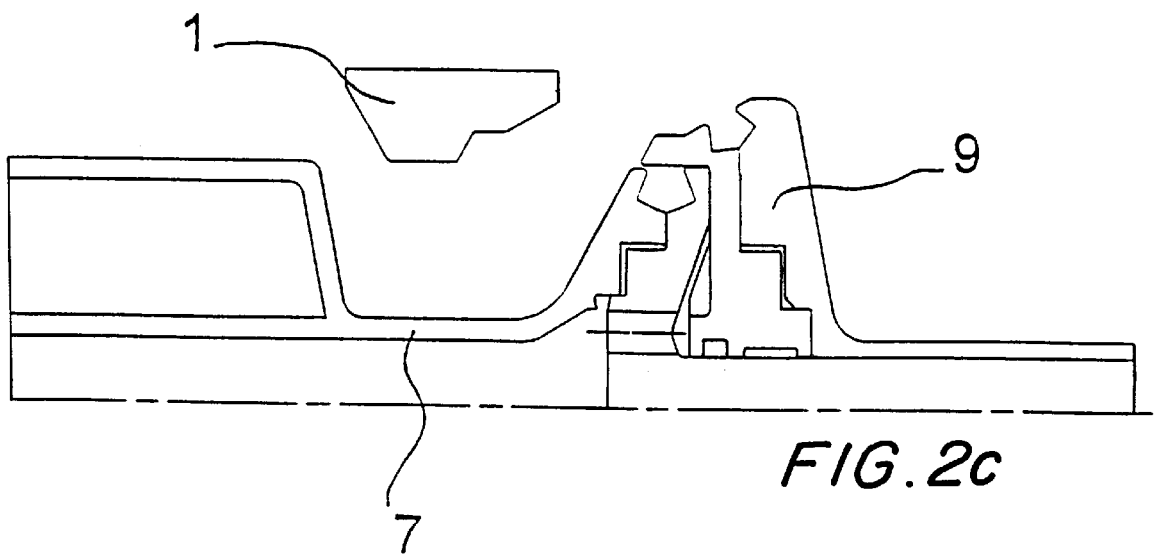

In FIGS. 2a through c, the successive steps in opening the dual-seat valve are shown.

As explained in FIG. 1, the dual-seat valve forms a double seal; the slide piston 7 is received in the first valve seat 2, and the second closing member 9 is received in the second valve seat 3.

For opening, the slide piston 7 is lifted in the direction of the second closing member 9. In the process, the slide piston 7 slides with its seal 12 along the wall of the first valve seat 2 onto the inner wall 23 of the recess 22, until it comes into contact (FIG. 2b) with the second closing member 9. The leakage chamber formed between the two closing members 7, 9 remains closed during the switching process. As the slide piston 7 lifts further, the second closing member 9 is lifted out of its seat 3. By further lifting of the closing members 7 and 9, the valve is switched into its open position (FIG. 2c).

The closing motion of the valve takes place in reverse order. By lowering of the closing members 7 and 9, the opening cross, section of the valve is constricted, until finally the cylindrical portions of the second valve seat and second closing member 9 move into one another, forming a throttle gap. The second closing member 9 is guided and centered by the conical portion 4. As the throttle gap is increases in size, the pressure of the flow of medium that has passed over to the other side decreases, until the second closing member has completely entered its seat, and a first seal forms between the lines that communicate through the valve. On being further lowered, the slide piston 7 separates from the second closing member 9 and moves into the first valve seat 2, forming a second seal. In this process, it is guided and centered by the conical portion 6.

For seat cleaning, the closing members are each moved individually out of their positions of repose.

Figure 3:
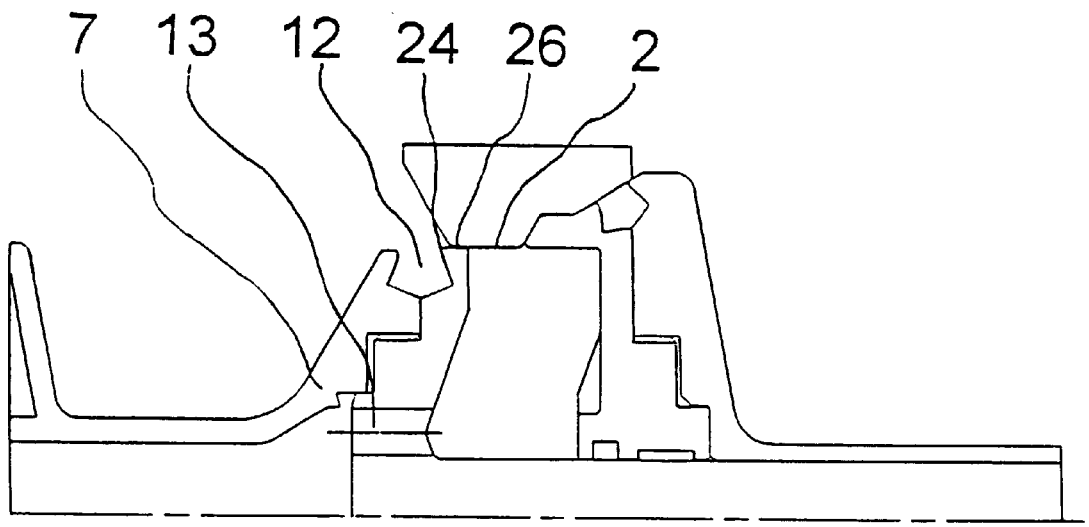
FIG. 3: the cleaning stroke of the first closing member of a dual-seat valve of FIG. 1.

In FIG. 3, the seat cleaning of the first valve seat is shown. To that end, the slide piston 7 is lowered far enough that the seal 12 has moved all the way out of the first valve seat 2. Between the cylindrical inside face of the valve seat 2 and the cylindrical face 24, a cylindrical throttle gap 26 forms; through it, cleaning fluid can enter the leakage chamber formed between the closing members 7, 9 to clean the valve seat, and from this chamber the cleaning fluid is carried away via the opening 13. The width of the gap is typically 0.15 mm. However, depending on the dimensions of the lines and the valve, it can be varied arbitrarily. Because of the lengths of the throttle gap, the volumetric flow of cleaning medium passing to the other side is relatively insensitive to fluctuations in the cleaning stroke. Pressure surges in the leakage chamber during the cleaning stroke are reliably avoided.

Figure 4:
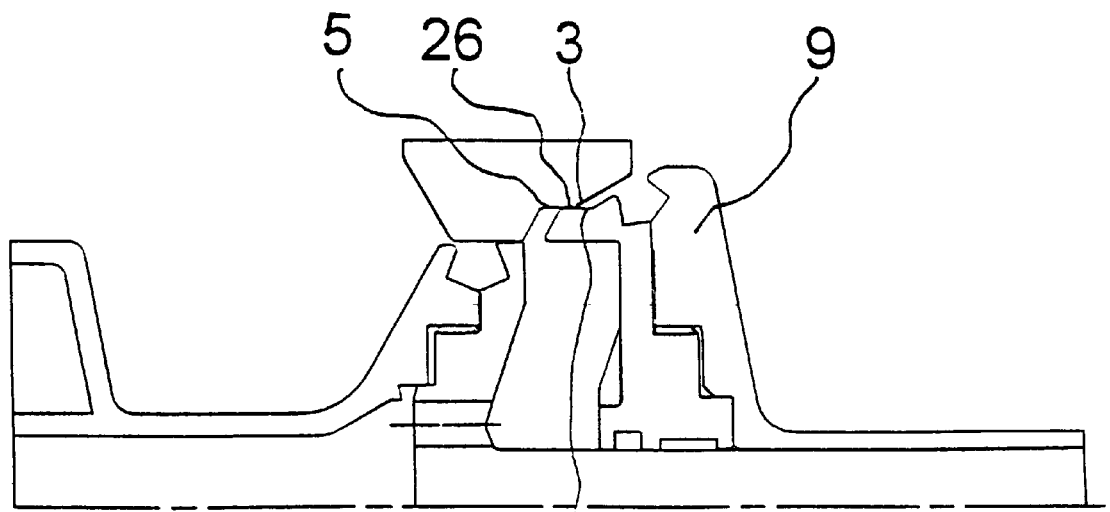
FIG. 4: the cleaning stroke of the second closing member of a dual-seat valve of FIG. 1.

In FIG. 4, the cleaning stroke of the second closing member 9 is shown. To that end, the second closing member 9 is lifted far enough out of the second valve seat 3 that a throttle gap 26 forms between the cylindrical portion 5 of the valve seat 3 and the cylindrical portion 20 of the second closing member 9, through which gap cleaning medium can flow into the leakage chamber formed between the closing members, for cleaning the seat. Once again, because of the length of the gap, the flow of cleaning medium passing over is relatively insensitive to fluctuations in the cleaning stroke. Pressure spikes during the opening motion are prevented.

Figure 7:
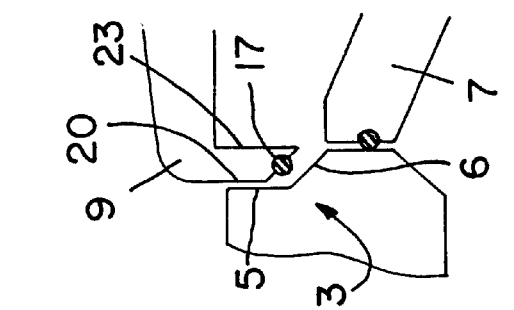
FIG. 7: the cleaning stroke of the second closing member of a dual-seat valve of FIG. 5.
Figures 5C, 6:
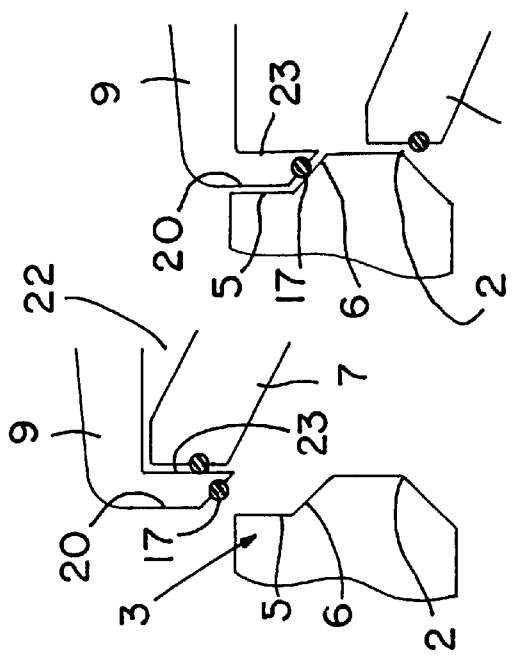
FIGS. 5a–c: a detail of a section through a second embodiment of the dual-seat valve, showing successive steps in the opening of the valve.
FIG. 6: the cleaning stroke of the first closing member of a dual-seat valve of FIG. 4.
Figure 5B:
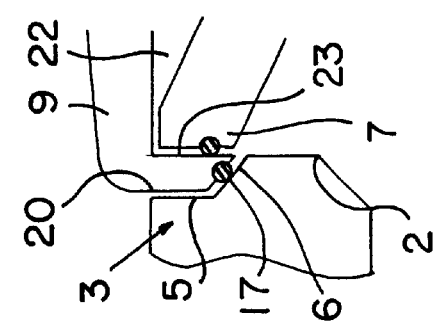
Figure 5A:
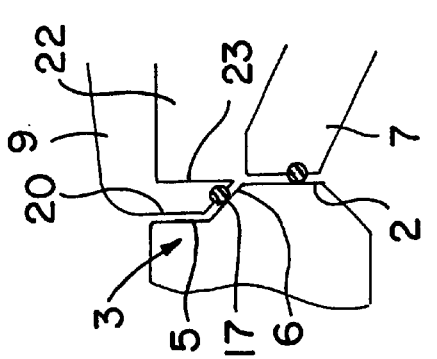

FIGS. 5 through 7 show operating states, analogous to FIGS. 1 through 4, for a second embodiment of the dual-seat valve. The slide piston 7 and valve seat 2, in their construction, agree with the corresponding parts of the first embodiment of the dual-seat valve. The second valve seat includes a cylindrical portion 5 and a conical portion 6 adjoining it toward the first valve seat 2. This portion 6 can also extend perpendicular to the portion 5.

The second closing member is constructed largely analogously to the second closing member 9 of the first embodiment (FIG. 1). The seal 17, however, is provided on the edge surrounding the recess 22, and in the closing position of the valve it rests on the conical face 6 of the valve seat that extends in the direction toward the first valve seat.

The opening and closing motion of the valve takes place analogously to the first embodiment. The first closing member 7 is lifted and moves into the recess 22 of the second closing member (FIG. 5b). In its further motion, it lifts the first closing member out of its valve seat, thus opening a gap between the cylindrical faces 5 and 20. Next, both closing members are shifted into the open position of the valve (FIG. 5c). The closure of the valve takes place with the steps in reverse order.

The cleaning stroke for the first closing member 7 (FIG. 6) corresponds to that already described for the first embodiment (FIG. 3).

In the cleaning stroke of the second valve seat 3, the closing member 9 is lifted somewhat. Once the seal 17 has separated from its associated face 6, cleaning medium for seat cleaning can flow into the leakage chamber through the gap formed between the cylindrical faces 5 and 20.

In the third embodiment of the dual-seat valve, shown in FIGS. 8 through 10, the seal 17 is disposed on the cylindrical face 20 of the second closing member 9. In the opening motion, as already described for the first embodiment, the first closing member 7 moves into the recess 22 of the second closing member 9 (FIG. 8b). Next, both closing members 7, 9 are lifted more, until the seal 17 slides out of the face 5 and opens the gap provided between the cylindrical faces 5 and 20 of the valve seat 3 and of the second closing member 9, respectively. After that, both closing members 7, 9 are shifted farther into the open position (FIG. 8c). In the closing motion, the gap correspondingly develops first between the faces 5 and 22, before the seal 17 moves into the valve seat.

The cleaning stroke of the first closing member shown in FIG. 9 corresponds to that already describe for the first embodiment (FIG. 3).

In the cleaning stroke of the second valve seat 3, shown in FIG. 10, the second closing member 9 is lifted far enough that the seal 17 has moved out of the valve seat 3. The gap formed between the cylindrical faces 5 and 20 is then uncovered, through which cleaning medium for seat cleaning can enter the leakage chamber formed between the closing members 7 and 9. In this arrangement as well, the flow of cleaning medium is comparatively insensitive to fluctuations in the cleaning stroke.

What is claimed is:

1. A dual-seat valve that switches in a leak-free manner, including:

a valve housing part (1) having at least two openings for two lines for letting fluid in and out, two coaxial valve seats (2, 3) disposed between these openings, two valve closing members (7, 9) that are each guided in the valve housing part (1) between an open position and a closing position for coaxial motion relative to one another and to the corresponding valve seats (2, 30) and which in their closing position effect double sealing between said openings, the first closing member being a slide piston (7) with radial sealing means (12) disposed on an end portion of said slide piston, said piston pressing, during an opening motion, against the second closing member (9) and during the continued opening motion moving the second closing member (9) into its open position as well, the first valve seat (2) being cylindrical and in the closing position receiving the slide piston (7) in sealing fashion, and both in the closing position and in the open position a leakage chamber is formed between the closing members, which communicates permanently with the outside of the valve via a drain outlet (25), characterized in that a cylindrical inside face (5) is provided at the second valve seat (3), and a cylindrical portion (20) corresponding to said cylindrical inside face (5) is provided on the second closing member (9), the diameter of which portion is less than the diameter of the cylindrical inside face (5) of the second valve seat (3), and the cylindrical face (5, 20), both in a cleaning stroke and the closing and opening motion of the second closing member (9), form a throttle gap (26) between them, the second valve seat (3) having a conical portion (6) extending from the cylindrical inside face (5) of the second valve seat (3) to the first valve seat (2), and that a sealing means (17) is provided on the second closing member (9) in such a way that in the closing motion, the throttle gap (26) is formed first, before the sealing means (17) seals off the leakage chamber from the line.

2. The dual-seat valve of claim 1, characterized in that in a cleaning position of the slide piston (7), a cylindrical throttle gap (26) is formed between a cylindrical face (24) of the slide piston (7) and the first valve seat (2).

3. The dual-seat valve of claim 1, characterized in that the sealing means (12, 17) is formed as a radial seal on the slide piston (7) and/or on the second closing member (9).

4. The dual-seat valve of claim 1, characterized in that the sealing means (17) is an axial or conical seal on the end toward the slide piston (7) of the second closing member.

5. The dual-seat valve of claim 1, characterized in that the second valve seat has a conical portion (4) that adjoins the cylindrical portion (5) toward an opening side of the second closing member.

6. The dual-seat valve of claim 1, characterized in that the closing member (7, 9) is constructed from two parts (8, 10; 15, 18) joined together separably by means of a screw connection, and the sealing means (12, 17) is provided between the two parts.

7. The dual-seat valve of claim 1, characterized in that the second closing member (9), on an end toward the slide piston, has a recess (22) with a substantially cylindrical circumferential wall aligned with the first valve seat (2), and the recess (22) is dimensioned so as during the opening motion to sealingly receive the end portion and the radial sealing means (12) of the slide piston (7), before the second closing member (9) opens.

* * * * *